United States Patent [19]

Tither

[11] 3,997,331
[45] Dec. 14, 1976

[54] METALLIZED SALTS
[75] Inventor: Denis Tither, Clitheroe, England
[73] Assignee: Crysus (Lancashire) Limited, Chorley, England
[22] Filed: Aug. 13, 1973
[21] Appl. No.: 387,675

[30] Foreign Application Priority Data
Aug. 16, 1972 United Kingdom ............. 38105/72
Oct. 27, 1972 United Kingdom ............. 49637/72

[52] U.S. Cl. .............................. 75/.5 AB; 423/593;
423/395; 423/419; 423/493; 423/544;
423/463; 75/.5 A; 23/302 A; 62/534
[51] Int. Cl.² ................... B22F 9/00; C22B 34/36;
C01G 41/00
[58] Field of Search ............. 423/593; 34/5; 62/58,
62/534; 23/295, 305, 302 A; 75/.5 AB

[56] References Cited
UNITED STATES PATENTS

| 3,175,881 | 3/1965 | Chiola et al. ...................... 423/593 |
| 3,357,819 | 12/1967 | Landsberg ........................ 75/.5 AB |
| 3,440,732 | 4/1969 | Chiola et al. ............................. 34/5 |
| 3,451,764 | 6/1969 | MacWilliams et al. ............. 423/593 |
| 3,516,935 | 6/1970 | Monforte et al. .............. 252/62.56 |
| 3,755,530 | 8/1973 | Avila et al. .......................... 423/22 |
| 3,820,250 | 6/1974 | Mishkin et al. .......................... 34/5 |

FOREIGN PATENTS OR APPLICATIONS 217,766 9/1957 Australia ............................. 62/58

OTHER PUBLICATIONS

Taylor, "Journal of American Chemical Soc.", vol. 24, 1902, pp. 629–643.

Primary Examiner—Herbert T. Carter
Attorney, Agent, or Firm—James E. Nilles

[57] ABSTRACT

A process and apparatus for producing certain metal salts in very fine particulate form. The process comprises cooling a solution of metal salt until the solution freezes and thereafter evaporating the solvent under very low pressure. The process is particularly applicable to salts of tungsten and nickel from which submicron particles of tungsten and nickel can be produced.

7 Claims, 6 Drawing Figures

METALLIZED SALTS

This invention relates to metallised salts of small particle size, which may be subsequently processed to obtain fine metallic powders.

The term metallised salts as used herein is defined as a metal-containing compound which can be obtained from solution by either chemical or physical processing.

Typical examples are:-
$5(NH_4)_2O.12WO_3 5H_2O$
$NiCl_2$
$Ni(NO_3)_2$
$NiSO_4$
$NiCO_3$
$(NH_4)_2Pt\,Cl_6$
$Na_2WO_4$
$Ni\,(NH_3)_6SO_4$
$PbCO_3\,Pb(OH)_2$
$Co(NH_3)_2SO_4$ Ammonium paratungstate is a metallised salt which is frequently employed in the manufacture of tungsten powder for use in the production of, for example, tungsten carbide tips for tools and tungsten filament lamps. It has been found that in the production of such items, it is desirable that the particle or crystal size of the ammonium paratungstate should be as small as possible, for example of the order of 1–10$\mu$, in order to obtain a metal powder which yields the best products. For example in the production of tool tips a particle size of 90% < 0.5$\mu$ is preferred and in the production of mining tools a particle size of 70% < 1$\mu$ is desirable.

The conditions under which ammonium paratungstate crystallises from solution are extremely critical and the conventional procedures for obtaining ammonium paratungstate of small particle size are expensive and time-consuming. Recently it has been suggested that ammonium paratungstate of small particle size might be produced by spraying a solution thereof into a container of liquid nitrogen so as to flash freeze the ammonium paratungstate, the solvent thereafter being removed by evaporation. As far as the applicants are aware, the above suggestion has not been put into practice but it is certain that such a freeze drying technique would be expensive because it employs liquid nitrogen, and unless it was carefully controlled would not necessarily result in the formation of very small crystals of ammonium paratungstate.

We have now discovered that very small particles of metallised salts can be produced if a solution of the salt is frozen in an inert atmosphere under reduced pressure and thereafter the solvent is evaporated also under reduced pressure.

Accordingly the present invention provides a process for producing metallised salts of very small particle or crystal size, which process comprises the steps of placing a solution of a metallised salt in a chamber, closing the chamber, evacuating the chamber to remove air therefrom and to reduce the pressure within said chamber, admitting to said chamber a gas which is inert relative to the metallised salt in an amount which is not sufficient to raise the pressure in the chamber to atmoshpheric pressure, reducing the temperature of the solution so that the solution freezes, and thereafter evaporating the solvent from the frozen solution.

It has been found that when a solution of a metallised salt, for example ammonium paratungstate is treated in accordance with the process according to the invention, not only does the product have a very small particle size which allows the production of tungsten powder in the size range 0.2 to 0.8$\mu$ by a hydrogen reduction process, but in the case of ammonium paratungstate, has a form which is entirely novel. Hitherto ammonium paratungstate was known to have three hydrated crystal forms, each of which has a characteristic X-ray diffraction pattern. However, when ammonium paratungstate produced in accordance with the present invention was examined by X-ray analysis no diffracted lines whatsoever were observed. This finding alone is sufficient to indicate that the ammonium paratungstate produced by the present invention is different in form from the previously known forms but the difference was confirmed by scanning electron microscopy. Under the scanning electron microscope the cubic crystal form of the known forms of ammonium paratungstate was observed whereas ammonium paratungstate produced according to the present invention was shown to have a structure which consists of many shapes, the majority of which are layers and needles which are agglomerates of very small particles.

Thus the present invention also provides a novel form of ammonium paratungstate which is characterised by the fact that under X-ray analysis thereof no diffracted lines are observed.

The present invention can also be used in conjunction with nickel salts, such as nickel chloride and nickel nitrate solutions and is capable of producing these metallised salts of nickel in a form which permits "submicron" nickel powder to be produced by a hydrogen reduction process.

The invention also provides apparatus for carrying out the process defined above, which apparatus comprises a chamber, means for evacuating said chamber, means for admitting inert gas to said chamber and means for controlling the temperature within said chamber. Specific embodiments of the invention will now be described by way of example with reference to the accompnaying drawings in which:-

Figure 1:
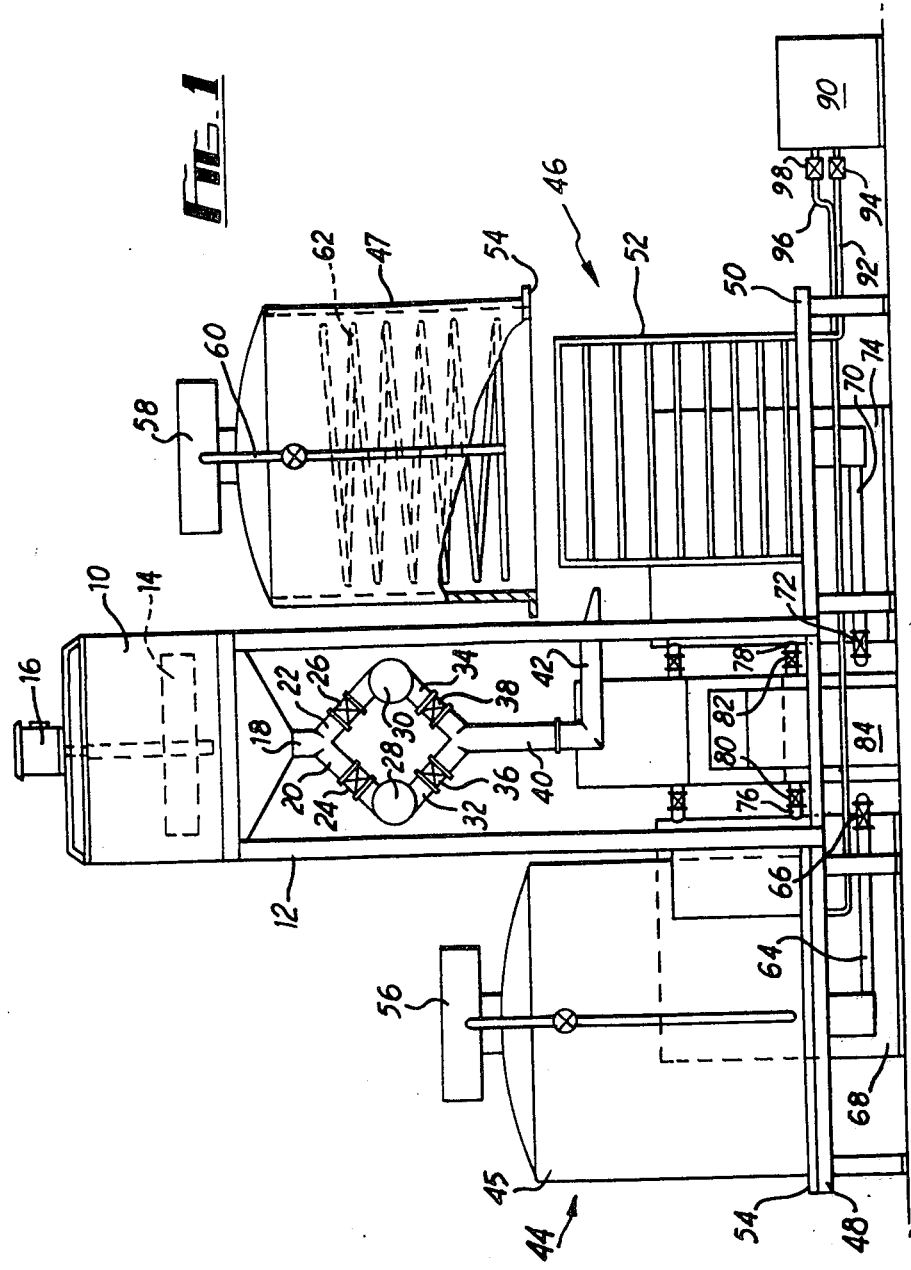
FIG. 1 is a diagrammatic representation of one form of apparatus for carrying out the invention.
Figure 4A:
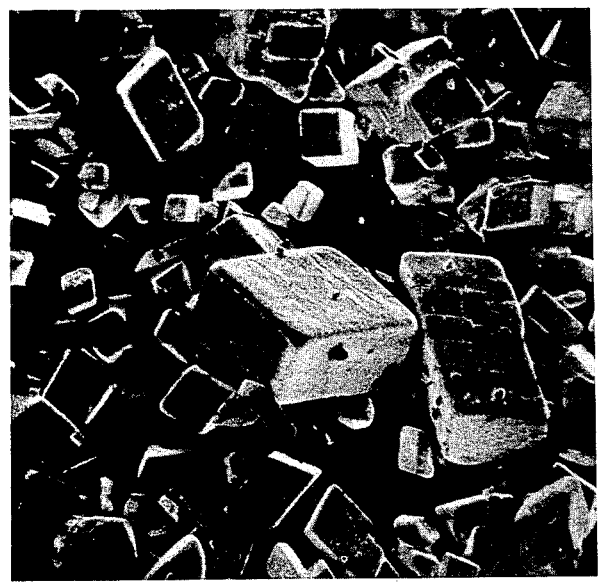
FIG. 4A shows the form of known ammonium paratungstate as observed under scanning electron microscope at × 500 magnification.
Figure 4B:
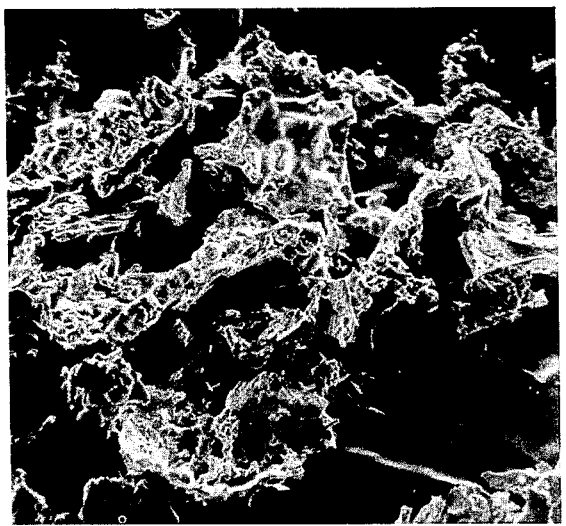
Figure 5:
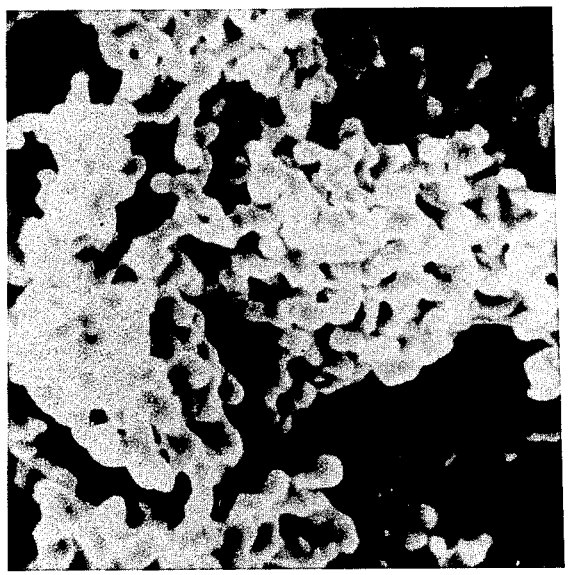

FIG. 4B shows the form of ammonium paratungstate produced in accordance with the present invention as observed under a scanning microscope at × 1000 magnification and FIG. 5 shows the form of nickel produced from nickel chloride produced in accordance with the present invention as observed in a scanning electron microscope. Referring to FIG. 1 of the drawings, the apparatus comprises a mixing tank 10 which is supported on a frame 12. The tank is equipped with a paddle 14 adapted to be driven by an electric motor 16. The lower part of the tank is of conical shape with its apex directed downwardly. An exit pipe 18 leads from the apex of the tank and divides into two branches 20 and 22, each of which are provided with valves 24 and 26 and which lead to filters 28 and 30 respectively. Pipes 32 and 34, each of which has a valve 36 and 38 respectively, lead from the filters 28 and 30 and are recombined into a single pipe 40. An L-shaped delivery pipe 42 is rotatably mounted on the lower end of the pipe 40.

The delivery pipe 42 is rotatable about the axis of pipe 40 so as to be capable of delivery to either one of the chambers 44 and 46. Each chamber comprises a hollow cylindrical housing 45 and 47 which is open at its lower end and which normally rests on a platform 48 and 50 respectively which closes off the open lower end. Chamber 44 is shown in FIG. 1 in that disposition. Each chamber can be raised to permit access to a plurality of spaced-apart, sumperimposed shelves 52 and chamber 46 is shown in the raised position. The edges of both chambers are outwardly flanged as at 54 and are equipped with seals known per se (not shown) so that when a chamber is seated on its platform it is closed to atmosphere in a fluid-tight fashion.

Tanks 56 and 58 are provided on the top of each housing 45 and 47 respectively. As shown more clearly in connection with housing 47, a pipe 60 leads from tank 58 to a coil 62 disposed within the housing dimensioned such that when the housing is lowered onto its platform the coil will surround the shelves. The coil is provided with apertures so that liquid from the tank 58 can be sprayed therethrough. A similar arrangement is provided for housing 48.

In order to reduce the pressure within the chamber 44 when it is closed, a pipe 64 leads from an outlet in the platform 48, through a valve 66 to a vacuum condenser 68. Similarly for chamber 46 a pipe 70 leads from an outlet in platform 50 through a valve 72 to a vacuum condenser 74.

The outlet 76 and 78 from each condenser 68, 74 respectively is led through valves 80 and 82 respectively to a rotary vacuum pump having two rootes blowers in series therewith indicated diagrammatically at 84.

The temperature of the shelves 52 in chamber 46 and the shelves in chamber 44 (which are not shown in FIG. 1) is controlled by fluid which circulates through passages formed in the shelves and through a heat exchanger 90. The heat exchanger 90 is connected to the passageways in shelves 52 by a pipe 92 having a valve 94 and to the shelves in chamber 44 by a pipe 96 having a valve 98.

The construction of the shelves will now be described in more detail with reference to FIGS. 2 and 3. Each shelf has the form of a disc which is of sufficient thickness to accommodate therewithin a substantially spiral passageway 100 which leads from the periphery of the disc to the centre or to a point close to the centre. The stack of shelves is formed by disposing distance pieces 102 between adjacent shelves, preferably at three of four points adjacent the periphery and selected distance pieces are hollow and form communicating passageways between adjacent shelves.

Figure 2:
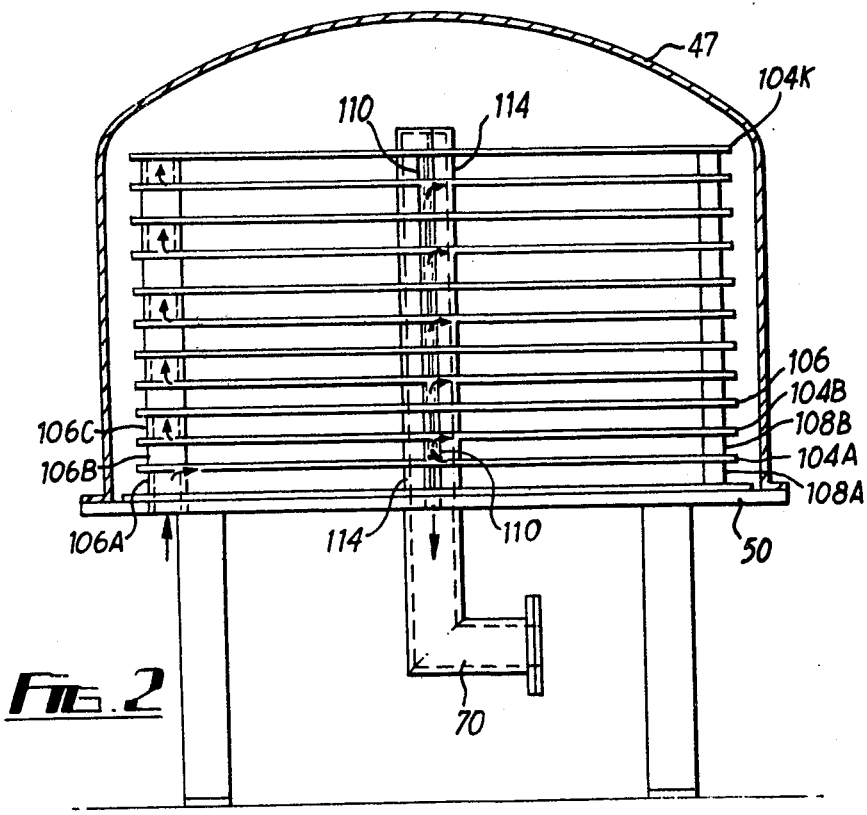
FIG. 2 is a side elevation, partly in section of the chamber in the closed position.
Figure 3:
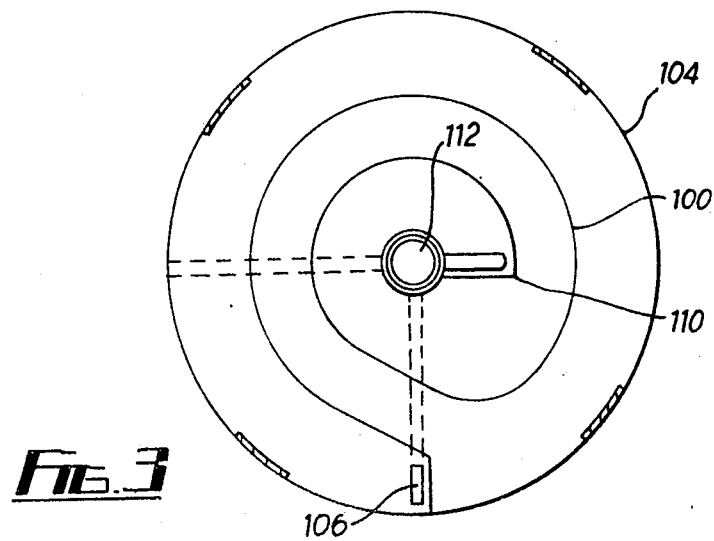
FIG. 3 is a diagrammatic representation in plan view of a shelf.

Thus as shown in greater detail in FIG. 2 the lowermost shelf 104A is spaced from the platform 50 by distance pieces adjacent the periphery of the shelf two of which 106A and 108A can be seen in the Figure. Distance piece 106A is hollow and is positioned so as to provide communication between pipe 92 from the heat exchanger 90 and the radially outer end of the spiral passageway in the shelf 104A. Shelf 104B is supported on shelf 104A by distance pieces 106B and 108B. Further the radially inner end of the spiral passageway in shelf 104A is connected to the radially inner end of the spiral passageway in shelf 104B by a passageway 110 the location of which can be seen in FIG. 3. The radially outer end of the helical passageway in shelf 104B is connected to the outer end of the helical passageway in shelf 104C by hollow distance piece 106C. This pattern of connections is repeated for the remaining shelves so that the flow of fluid in adjacent shelves is radially in opposite directions. The fluid path from the top shelf is conveniently led back to the heat exchanger by a passageway formed by the distance pieces 108 which are hollow and which are in register with apertures formed through the shelves themselves.

A central passageway 112 is formed in each shelf and distance pieces 114 are placed between each shelf and in register with the passageway 112. The lowermost distance piece 114A is connected to pipe 70 and the walls of the distance pieces 114 are perforated by means of slots, holes or the like.

It will be understood, however, that while an apparatus having two chambers has been described, any number of suitably interconnected chambers can be used or alternatively a single chamber only may be employed.

The invention will now be further illustrated by the following examples:-

EXAMPLE 1

Fine particles of ammonium paratungstate were produced using the apparatus described with reference to the drawings.

Tungstic acid and ammonium hydroxide were placed in the mixing tank 10 in quantities to form 8% by weight ammonium tungstate and the mixture stirred with the paddle 14 so as to keep it of uniform consistency. The housing 47 was raised so as to expose the shelves 52 on the platform 50 and trays were placed on each shelf. The trays were sector shaped, each sector having an angle of substantially 90° so that four trays were placed on each shelf.

The delivery pipe 42 was positioned above the trays on the top shelf and the valves 22, 24, 36 and 38 opened. Filtered ammonium tungstate was delivered to the trays on the top shelf and when those trays were full, the trays on the lower shelves were filled by overflow from the trays on the top shelf through overflow wiers provided on the trays. The depth of solution in each tray was ⅝ inches.

When all the trays were filled the valves 22, 24, 34 and 36 were closed and the housing lowered over the shelves 52 to make a fluid tight seal on the platform 50. The valves 72 and 82 were opened, the vacuum pump and rootes blowers set to operate and the pressure in chamber 47 reduced to 500 Torr. A chlorinated fluorinated hydrocarbon sold under the name "Freon" liquid was then admitted to the chamber 47 from the tank 58 until the pressure in the chamber rose to 600 Torr.

Cold fluid at a temperature of −50° C from the heat exchanger 90 was then circulated through the shelves in chamber 46 until the solution in the trays was frozen. During this time trays were placed on the shelves in chamber 44 and filled with solution from tank 10.

The total pressure in chamber 46 was now lowered to 0.1 Torr and the temperature of the shelves raised gradually to 120° C by circulating fluid at that temperature through the shelves. The heat, or a part thereof for raising the temperature as aforesaid was obtained from chamber 44 which during this time was closed and whose temperature was being lowered.

The solvent from the frozen solution in chamber 46 was evaporated off until the product in the trays was not more than 10% by weight of the original charge. The chamber 46 was then opened and the trays removed to recover the product therein which was found to be ammonium paratungstate, more than 50% by weight of which had an agglomerated particle size of less than 53μ. These multiparticulate agglomerates consisted of many particles of submicron size, and particles less than 10μ could be recovered by sieving. The multi-particulate agglomerates of size between 76μ and 53μ (the usually accepted most suitable size for X-ray diffraction analysis) were examined using an X-ray diffractometer, but no diffracted lines were observed.

The particles of size less than 10μ were examined by X-ray analysis but no diffracted lines were observed. It was also examined under the electron microscope which showed the particles to have a wholly novel structure as shown in FIG. 4B. The difference between the ammonium paratungstate produced in accordance with the invention and with ammonium paratungstate produced by prior art methods can be seen by comparing FIG. 4B with FIG. 4A, which latter shows the crystal morphology of ammonium paratungstate as produced hitherto.

Fresh trays were then placed on the shelves 52 which were filled in the manner already described. When the trays were full the chamber was closed and the shelves again cooled to freeze the solution in the trays. During this time the temperature in chamber 44 was raised to 120° C and the total pressure reduced to 0.1 Torr to evaporate solvent from the frozen solution therein, and the product in chamber 44 dealt with in the same manner as previously described with reference to chamber 46. Thus the two chambers operate in tandem and this enables the energy required to be transferred between the chambers, and, at least partially, conserved.

EXAMPLE 2

Fine particles of nickel have been obtained by the hydrogen reduction at 400° C of nickel chloride.

Nickel scrap was dissolved in dilute hydrochloric acid to produce a solution of metallised salt, i.e. nickel chloride. This solution was treated in the same manner as described in Example 1 except that after the solution was frozen, the total pressure in Chamber 46 was reduced to $5 \times 10^{-3}$ mm Hg.

The salt produced was found to be hygroscopic and eventually lost its unique structure on prolonged exposure to atmoshphere. However, hydrogen reduction of the salt produced extremely fine nickel powder of sub micron size as shown in FIG. 5 which is a photograph taken on a scanning electron microscope at × 11,400 magnification.

EXAMPLE 3

A solution of nickel nitrate was treated in the same manner as described in Example 2. The salt produced was thermally decomposed at 600° C to nickel oxide and then reduced at 400° C to yield a nickel powder of sub micron particle size similar to that shown in FIG. 5.

What is claimed is:

1. A process for producing particles of ammonium paratungstate and characterized in that under X-ray analysis no diffracted lines are observed, which process comprises the steps of placing a solution of ammonium paratungstate in a chamber, closing the chamber, reducing the pressure within the chamber below atmospheric pressure, freezing the solution by the combined effect of admitting to the chamber a liquid refrigerant which is inert to said ammonium paratungstate whereby the liquid refrigerant evaporates, the amount of liquid refrigerant admitted to the chamber being not sufficient to raise the pressure in the chamber to atmospheric pressure and circulating a cold fluid through heat exchange means in said chamber, and thereafter evaporating the solvent from the frozen solution.

2. A process as claimed in claim 1, wherein the pressure in the chamber is further reduced after the admission of said liquid refrigerant into the chamber.

3. A process as claimed in claim 1, wherein the pressure in the chamber rises by not more than 100 mm when said liquid refrigerant is admitted thereto.

4. A process as claimed in claim 1, wherein the solvent content of the frozen solution is reduced by the said evaporation to not more than 10% of the original weight.

5. A process as claimed in claim 1, wherein salt is recovered after evaporation and sieved to recover particles.

6. A process as claimed in claim 5, wherein particles of ammonium paratungstate having a size less than 10μ are recovered. d 7. A process as claimed in claim 6, wherein the ammonium paratungstate is reduced to tungsten metal.

* * * * *